United States Patent
Duquesne et al.

(10) Patent No.: US 9,578,810 B2
(45) Date of Patent: Feb. 28, 2017

(54) COMBINE CLEANING SYSTEM DRIVE ASSEMBLY

(71) Applicant: CNH Industrial America LLC, New Holland, PA (US)

(72) Inventors: Frank R. G. Duquesne, Zwevegem (BE); Todd A. Cannegieter, Boiling Springs, PA (US); Adrianus Naaktgeboren, Varsenare (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/693,157

(22) Filed: Apr. 22, 2015

(65) Prior Publication Data

US 2015/0305243 A1   Oct. 29, 2015

(30) Foreign Application Priority Data

Apr. 23, 2014   (BE) .................................. 2014/0286

(51) Int. Cl.
*A01F 12/56*   (2006.01)
*A01F 12/44*   (2006.01)

(52) U.S. Cl.
CPC ............ *A01F 12/446* (2013.01); *A01F 12/56* (2013.01)

(58) Field of Classification Search
CPC ....... A01F 12/446; A01F 12/448; A01F 12/56
USPC .................................... 460/93, 116
See application file for complete search history.

(56) References Cited

U.S. PATENT DOCUMENTS

| | | | | |
|---|---|---|---|---|
| 2,212,092 A * | 8/1940 | Wood | ...................... | A01F 12/44 460/92 |
| 4,557,276 A | 12/1985 | Hyman et al. | | |
| 4,723,558 A * | 2/1988 | Usick | ...................... | A01F 12/44 460/100 |
| 4,807,487 A * | 2/1989 | Seidl | ......................... | B07B 1/44 198/766 |
| 6,412,260 B1 * | 7/2002 | Lukac | ................... | A01F 12/446 460/142 |
| 6,672,957 B2 * | 1/2004 | Voss | ...................... | A01F 12/448 460/101 |
| 9,226,450 B2 * | 1/2016 | Pearson | ................ | A01F 12/446 |

(Continued)

FOREIGN PATENT DOCUMENTS

DE   2743733 A1   4/1979
GB   864257 A   3/1961

*Primary Examiner* — John G Weiss
(74) *Attorney, Agent, or Firm* — Peter K. Zacharias; Patrick M. Sheldrake (57) ABSTRACT

A combine harvester having a cleaning system for separating seeds from by-products, that includes a transmission having an annular member, that extends around a circular element of an eccentric device and is pivotable around said circular element, a second arm having a first end fixedly connected to the annular member, and a second end connected with a reciprocatable cleaner device of a second cleaner assembly, a first arm having a first end fixedly connected to the annular member, a first cleaner drive linkage has a first end pivotably connected to the second end of the first arm and a second end connected to a reciprocatable cleaner device of a first cleaner assembly, wherein the reciprocatable cleaner device of the second cleaner assembly and the reciprocatable cleaner device of the first cleaner assembly are reciprocatingly drivable by the cleaning system drive assembly in generally opposite directions.

12 Claims, 5 Drawing Sheets (56) References Cited

U.S. PATENT DOCUMENTS

2006/0270473 A1 11/2006 Straeter

\* cited by examiner

COMBINE CLEANING SYSTEM DRIVE ASSEMBLY

CROSS-REFERENCE TO RELATED APPLICATIONS

This application claims foreign priority under 35 U.S.C. §119 to Belgian Application BE2014/0286 filed Apr. 23, 2014 titled "Combine Harvester" and having Frank R. G. Duquesne, Todd A. Cannegieter and Adrianus Naaktgeboren as the inventors. The full disclosure of BE2014/0286 is hereby incorporated herein by reference.

FIELD OF THE INVENTION

The invention pertains to a combine harvester having a cleaning system for separating harvested seeds from by-products that are harvested along with said seeds.

BACKGROUND OF THE INVENTION

Combine harvesters are widely used in the harvesting of various types of grain, corn and other crops of which the seed is harvested. Typically, a combine harvester comprises a header having a cutter bar, which cuts the plants that contain the seeds to be harvested from the field. The thus harvested crop is threshed inside the combine harvester, in which process the seeds are separated from the other parts of the plants. The stalks of the harvested plants are removed from the combine harvester via a straw walker and a mixture of harvested seeds and by-products remains in the combine harvester. These by-products (e.g. chaff or "ears") are generally smaller than the stalks that are removed from the combine harvester via the straw walker.

The mixture of harvested seeds and these by-products is transported to a cleaning system, in which the threshed seeds are separated from the by-products. The cleaning system generally comprises one or more grain pans and one or more sieves, which perform a reciprocating movement during use. The sieved seeds are then collected and transported to the grain tank of the combine harvester, which is generally emptied periodically.

The grain pan and sieve or sieves of the cleaning system are generally arranged at an angle relative to the horizontal, with the front end of the sieve (that is, the end closest to the cutter bar) lower than the rear end of the sieve. The reciprocating movement of the grain pan and sieve makes that the seeds and by-products are thrown upwards and backwards by the grain pan or sieve, respectively. A fan blows air over and through the sieve, to catch the lighter particles of the by-products and keep them airborne until they are blown out of the combine harvester.

In known arrangements, the combine harvester comprises a drive mechanism for the cleaning system. Such a drive mechanism typically comprises a rotatable drive shaft that drives the grain pan or grain pans as well as the sieve or sieves. The grain pans and sieves are connected to the rotatable drive shaft through a transmission comprising mechanical elements such as eccentric drives and linkages. Often, one linkage system is used to drive multiple sieves, grain pans or a sieve and a grain pan at the same time. For example, DE 2743733 uses such an arrangement.

In these known arrangements, the mechanical elements in the transmission are subjected to high mechanical loads.

SUMMERY OF THE INVENTION

It is the object of the invention to provide an improved cleaning system for a combine harvester.

This object is achieved by a combine harvester comprising a cleaning system for separating harvested seeds from by-products that are harvested along with said seeds, said cleaning system comprising:
  a first cleaner assembly, which first cleaner assembly comprises at least one reciprocatable cleaner device, and
  a second cleaner assembly, which second cleaner assembly comprises at least one reciprocatable cleaner device and
  a cleaning system drive assembly, which cleaning system drive assembly comprises:
    a rotatable drive shaft,
    an eccentric device that comprises a circular element that is connected at a shaft connection point to the rotatable drive shaft to rotate with the rotatable drive shaft, which shaft connection point is located at a distance from the center of the circular element,
    a transmission, which transmission comprises:
      an annular member, which annular member extends around the circular element and is pivotable around said circular element,
      a second arm which has a first end and a second end, which first end is fixedly connected to the annular member, and which second end is in connection with the reciprocatable cleaner device of the second cleaner assembly,
      a first arm which has a first end and a second end, which first end is fixedly connected to the annular member,
      a first cleaner drive linkage which has a first end and a second end, which first end of the first cleaner drive linkage is pivotably connected to the second end of the first arm and which second end of the first cleaner drive linkage is connected to the reciprocatable cleaner device of the first cleaner assembly,
    wherein the reciprocatable cleaner device of the second cleaner assembly and the reciprocatable cleaner device of the first cleaner assembly are reciprocatingly drivable by the cleaning system drive assembly in generally opposite directions.

Preferably, the reciprocatable cleaner device of the second cleaner assembly and the reciprocatable cleaner device of the first cleaner assembly are reciprocatingly drivable by the cleaning system drive assembly in generally parallel but opposite directions.

With the cleaning system drive assembly according to the invention, a compact drive for the cleaners is provided. The first and second cleaner assemblies each have their own connection to the annular member, which is close to the rotatable drive shaft. This allows keeping the mechanical elements of the transmission short and simple. Furthermore, the first and second arms each only drive one cleaner assembly, so the mechanical loads in the arms are reduced as compared to known arrangements. This allows for a lighter construction, which further reduces the mechanical loads. And as the cleaning system drive assembly drives the reciprocatable cleaner device of the first cleaner assembly and the reciprocatable cleaner device of the second cleaner assembly reciprocatingly in generally opposite (and preferably generally parallel) directions, at least some of the mechanical loads in the system counterbalance each other at least partly, which also reduces the mechanical loads on the transmission. A cleaner assembly can be a sieve assembly or a grain pan assembly. In a sieve assembly, the reciprocatable cleaner device is a sieve. A sieve assembly can comprise one or more sieves. In a grain pan assembly, the reciprocatable cleaner device is a grain pan. A grain pan assembly can comprise one or more grain pans.

In a possible embodiment, the first cleaner assembly is a grain pan assembly and the second cleaner assembly is a sieve assembly.

In a possible embodiment, the first cleaner assembly is a sieve assembly and the second cleaner assembly is also a sieve assembly.

In a possible embodiment, the first cleaner assembly is a grain pan assembly and the second cleaner assembly is also a grain pan assembly.

In a possible embodiment, the first cleaner assembly is a sieve assembly and the second cleaner assembly is a grain pan assembly.

In a possible embodiment, a sieve assembly comprises a first sieve and a second sieve and a sieve linkage. The sieve linkage has a first end that is connected to the first sieve and a second end that is connected to the second sieve. In this embodiment, the cleaning system drive assembly engages the first sieve. The second sieve is then driven by the sieve linkage. The movement of the first sieve, which is imposed on it by the cleaning system drive assembly, forms the input movement for the sieve linkage.

Optionally, in this embodiment, the first sieve and the second sieve of the same sieve assembly are reciprocately moveable in generally parallel but mutually opposite directions. This reduces the mechanical loads on the cleaning system and on the combine harvester in general because at least some of the mechanical loads that are induced by the reciprocating sieves counterbalance each other at least partly.

In a possible embodiment, a grain pan assembly comprises a first grain pan and a second grain pan and a grain pan linkage. The grain pan linkage has a first end that is connected to the first grain pan and a second end that is connected to the second grain pan. In this embodiment, the cleaning system drive assembly engages the first grain pan. The second grain pan is then driven by the grain pan linkage. The movement of the first grain pan, which is imposed on it by the cleaning system drive assembly, forms the input movement for the grain pan linkage.

Optionally, in this embodiment, the first grain pan and the second grain pan of the same grain pan assembly are reciprocately moveable in generally parallel but mutually opposite directions. This reduces the mechanical loads on the cleaning system and on the combine harvester in general because at least some of the mechanical loads that are induced by the reciprocating grain pans counterbalance each other at least partly.

Optionally, the transmission further comprises a second cleaner drive linkage which has a first end and a second end. The first end of the second cleaner drive linkage is pivotably connected to the second end of the second arm and the second end of the second cleaner drive linkage is connected to the reciprocatable cleaner device of the second cleaner assembly. The presence of a second cleaner drive linkage allows imposing a movement on the reciprocatable cleaner device of the second cleaner assembly that is different from the movement of the second arm of the transmission.

Optionally, the second cleaner drive linkage comprises an adjustable link, which adjustable link allows adjusting the stroke and/or throwing angle of the reciprocatable cleaner device of the second cleaner assembly.

Optionally, the first cleaner drive linkage comprises an adjustable link, which adjustable link allows to adjust the stroke and/or throwing angle of the reciprocatable cleaner device of the first cleaner assembly.

BREIF DESCRIPTION OF THE DRAWINGS

The invention will be described in more detail below under reference to the drawing, in which in a non-limiting manner exemplary embodiments of the invention will be shown. The drawing shows in.

DETAILED DESCRIPTION OF THE INVENTION

Figure 1:
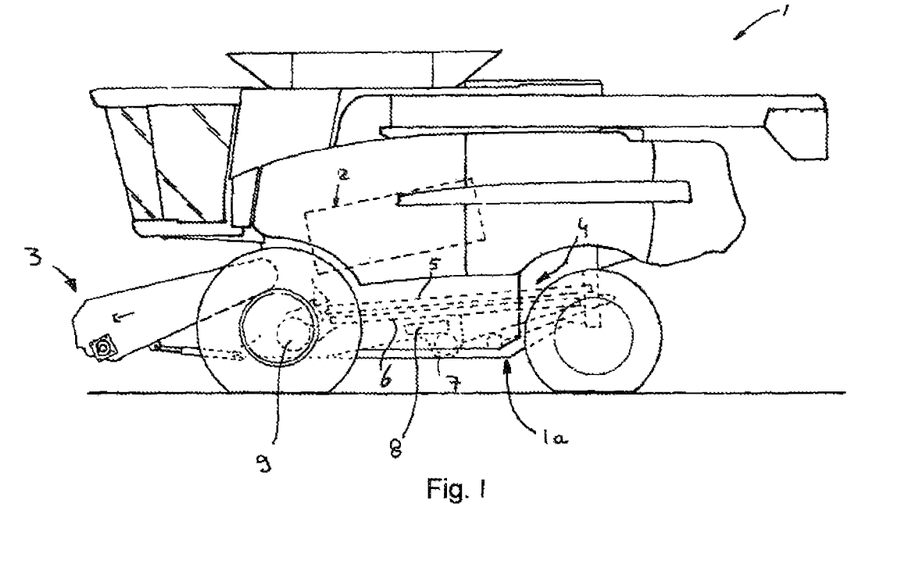
FIG. 1: an agricultural combine harvester

FIG. 1 shows a conventional agricultural combine harvester 1 having a combine harvester chassis 1a. The combine harvester 1 generally includes a thresher 2 operable for receiving crop material from a harvesting mechanism, which is connected in front of the crop feeder 3 on a front end of the combine harvester 1. The thresher 2 separates smaller grains, seeds, pods and related plant material from larger stalks, stems, leaves, husks and other elements of the crop material, as well as vines, weeds and the like which may be present in the harvested crop material. The smaller material falls from thresher 2 and is conveyed to a cleaning system 4. The smaller material is a mixture of seeds (e.g. grain, corn) and by-products.

In the embodiment of FIG. 1, the cleaning system 4 comprises multiple sieves. However, simpler embodiments, where just a single sieve is present are possible as well.

The cleaning system 4 of FIG. 1 includes an upper, relatively coarse sieve 5. This coarse sieve 5 receives the mixture of seeds and by-products from the thresher 2. Furthermore, a lower, relatively fine sieve 6 is provided. This fine sieve 6 receives seeds such as grain or corn which pass through the coarse sieve 5. Sieves 5, 6, separate the seed from the remaining by-products of other material, such as pod fragments and the like. The seed is collected below the sieves 5, 6, where an auger 7 is provided that conveys the clean seeds to an elevator, which in turn conveys the clean seeds upwardly to a grain tank.

The sieves 5, 6 are reciprocated to perform a reciprocating sieve movement by a sieve drive assembly 8 for facilitating sifting of the crop material therethrough. The reciprocating sieve movement also transports the material onto the sieve towards the rear of the combine harvester 1 by throwing the material upwards and rearwards.

Material which does not pass through the sieves 5, 6 is moved rearwardly on the coarse sieve 5 or the fine sieve 6 by reciprocal sieve movement. Particles that don't pass through the upper sieve 5 drop from the rear end of the sieves 5 through an opening in the rear of combine 1. Particles that do get through the upper sieve 5 but not through the lower sieve 6 are rethreshed. A fan 9 is provided that blows a stream of air through and over the sieves 5, to catch the lighter particles of the by-products and keep them airborne until they blown out of the combine harvester 1.

Figure 2:
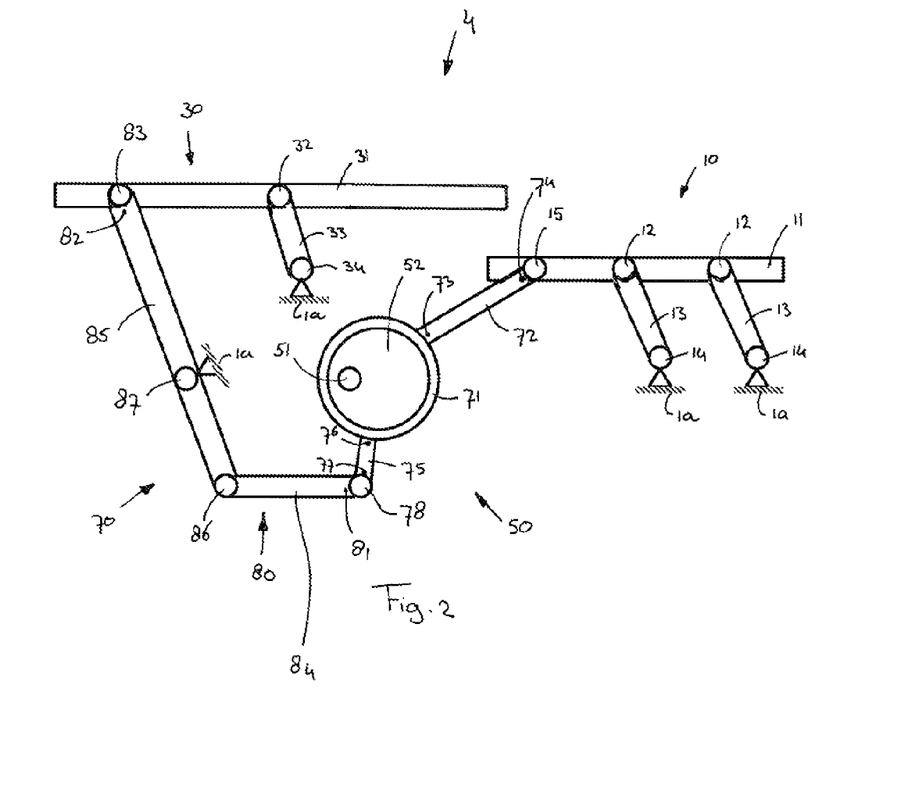
FIG. 2: schematically, a first embodiment of a cleaning system according to the invention.

FIG. 2 schematically shows a first embodiment of a cleaning system 4 according to the invention. The cleaning system 4 comprises a second cleaner assembly 10 and a first cleaner assembly 30.

The second cleaner assembly 10 comprises a reciprocatable cleaner device 11. The second cleaner assembly 10 is for example a sieve assembly. In that case, the reciprocatable cleaner device 11 is a sieve. In an alternative embodiment, the second cleaner assembly 10 is a grain pan assembly. In that case, the reciprocatable cleaner device 11 is a grain pan.

The first cleaner assembly 30 comprises a reciprocatable cleaner device 31. The first cleaner assembly 30 is for example a grain pan assembly. In that case, the reciprocatable cleaner device 31 is a grain pan. In an alternative embodiment, the first cleaner assembly 30 is a sieve assembly. In that case, the reciprocatable cleaner device 31 is a sieve.

In the embodiment of FIG. 2, the reciprocatable cleaner device 11 of the second cleaner assembly 10 is pivotably mounted on two rocker arms 13 via pivots 12. The pivots 12 are each arranged on one end of the respective rocker arm 13 to which they are connected. Pivots 14 are present on the opposite end of the respective rocker arms 13. The pivots 14 pivotably connect a rocker arm 13 to the chassis 1a of the combine harvester.

In the embodiment of FIG. 2, the reciprocatable cleaner device 31 of the first cleaner assembly 30 is pivotably mounted on one rocker arm 33 via pivot 32. The pivot 32 is arranged on one end of the rocker arm 33. Pivot 34 is present on the opposite end of the rocker arm 33. The pivot 34 pivotably connects the rocker arm 33 to the chassis 1a of the combine harvester.

The cleaning system 4 according to FIG. 2 further comprises a cleaning system drive assembly 50. The cleaning system drive assembly 50 comprises a rotatable drive shaft 51, an eccentric device that comprises a circular element 52. The circular element 52 is connected at a shaft connection point to the rotatable drive shaft 51 to rotate with the rotatable drive shaft. The shaft connection point is located at a distance from the center of the circular element 52. The cleaning system drive assembly 50 comprises a transmission 70.

The transmission 70 comprises an annular member 71. This annular member 71 extends around the circular element 52 and is pivotable around said circular element 52, for example by means of a bearing that extends between the circular element 52 and the annular member 71.

The transmission 70 further comprises a second arm 72. The second arm 72 has a first end 73 and a second end 74. The first end 73 of the second arm 72 is fixedly connected to the annular member 71. The second end 74 of the second arm 72 is in connection with the reciprocatable cleaner device 11 of the second cleaner assembly 10 via pivot 15.

The transmission 70 further comprises a first arm 75. The first arm 75 has a first end 76 and a second end 77. The first end 76 of the first arm 75 is fixedly connected to the annular member 71.

The transmission 70 further comprises a first cleaner drive linkage 80. The first cleaner drive linkage 80 has a first end 81 and a second end 82. The first end 81 of the first cleaner drive linkage 80 is pivotably connected to the second end 77 of the first arm 75 through pivot 78. The second end 82 of the first cleaner drive linkage 80 is connected to the reciprocatable cleaner device 31 of the first cleaner assembly 30, in the embodiment of FIG. 2 via pivot 83.

In the embodiment of FIG. 2, the first cleaner drive linkage 80 comprises a first link 84 and a second link 85. The first link 84 and the second link 85 are pivotably connected to each other through pivot 86. The second link 85 is furthermore pivotably connected to the chassis 1a of the combine harvester through pivot 87. Pivot 86 and pivot 83 are arranged on opposite sides of pivot 87, which makes that the reciprocatable cleaner device 11 of the second cleaner assembly 10 and the reciprocatable cleaner device 31 of the first cleaner assembly 30 are driven in opposite directions.

The reciprocatable cleaner device 11 of the second cleaner assembly 10 and the reciprocatable cleaner device 31 of the first cleaner assembly 30 are reciprocatingly driven by the cleaning system drive assembly 50 in generally parallel but opposite directions.

Figure 3:
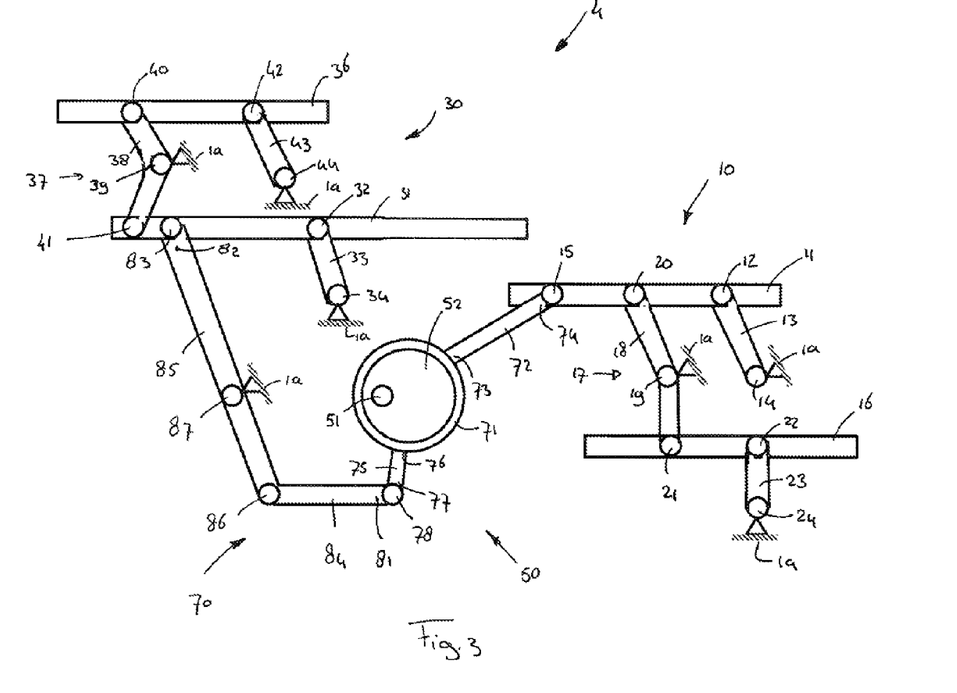
FIG. 3: schematically, a second embodiment of a cleaning system according to the invention.

FIG. 3 schematically shows a second embodiment of a cleaning system 4 according to the invention. The embodiment of FIG. 3 is similar to the embodiment of FIG. 2, but in the embodiment of FIG. 3 the second cleaner assembly 10 and the first cleaner assembly 30 each comprise two reciprocatable cleaner devices 11, 16, 31, 36.

The second cleaner assembly 10 is for example a sieve assembly. In that case, the reciprocatable cleaner devices 11, 16 are sieves. In an alternative embodiment, the second cleaner assembly 10 is a grain pan assembly. In that case, the reciprocatable cleaner devices 11, are grain pans.

The first cleaner assembly 30 is for example a grain pan assembly. In that case, the reciprocatable cleaner devices 31, 36 are grain pans. In an alternative embodiment, the first cleaner assembly 30 is a sieve assembly. In that case, the reciprocatable cleaner devices 31, 36 are sieves.

In the embodiment of FIG. 3, the reciprocatable cleaner device 11 of the second cleaner assembly 10 is pivotably mounted on a rocker arm 13 via pivot 12. The pivot 12 is arranged on one end of the rocker arm 13. Pivot 14 is present on the opposite end of the rocker arm 13. The pivot 14 pivotably connects the rocker arm 13 to the chassis 1a of the combine harvester.

In the embodiment of FIG. 3, the second cleaner assembly 10 comprises a second cleaner assembly linkage 17. If the second cleaner assembly 10 is a sieve assembly, the second cleaner assembly linkage 17 is a sieve linkage. If the second cleaner assembly 10 is a grain pan assembly, the second cleaner assembly linkage 17 is a grain pan linkage.

In the embodiment of FIG. 3, the second cleaner assembly linkage 17 comprises a single link 18, which has a central pivot 19. The central pivot 19 pivotably connects the link 18 to the chassis 1a of the combine harvester. The linkage 17 further comprises a pivot 20, which pivotably connects the link 18 to the first reciprocatable cleaner device 11 of the second cleaner assembly 10. The linkage 17 further comprises a pivot 21, which pivotably connects the link 18 to the second reciprocatable cleaner device 16 of the second cleaner assembly 10. The pivots 20 and 21 are arranged on opposite sides of the central pivot 19, so that the first reciprocatable cleaner device 11 and the second reciprocatable cleaner device 16 move in opposite directions.

In this embodiment, the second reciprocatable cleaner device 16 of the second cleaner assembly 10 is pivotably mounted on a rocker arm 23 via pivot 22. The pivot 22 is arranged on one end of the rocker arm 23. Pivot 24 is present on the opposite end of the rocker arm 23. The pivot 24 pivotably connects the rocker arm 23 to the chassis 1a of the combine harvester.

In the embodiment of FIG. 3, the reciprocatable cleaner device 31 of the first cleaner assembly 30 is pivotably mounted on one rocker arm 33 via pivot 32. The pivot 32 is arranged on one end of the rocker arm 33. Pivot 34 is present on the opposite end of the rocker arm 33. The pivot 34 pivotably connects the rocker arm 33 to the chassis 1a of the combine harvester.

In the embodiment of FIG. 3, the first cleaner assembly 30 comprises a first cleaner assembly linkage 37. If the first cleaner assembly 30 is a sieve assembly, the first cleaner assembly linkage 37 is a sieve linkage. If the first cleaner assembly 30 is a grain pan assembly, the first cleaner assembly linkage 37 is a grain pan linkage.

In the embodiment of FIG. 3, the first cleaner assembly linkage 37 comprises a single link 38, which has a central pivot 39. The central pivot 39 pivotably connects the link 38 to the chassis 1a of the combine harvester. The linkage 37 further comprises a pivot 40, which pivotably connects the link 38 to the second reciprocatable cleaner device 36 of the first cleaner assembly 30. The linkage 37 further comprises a pivot 41, which pivotably connects the link 18 to the first reciprocatable cleaner device 31 of the first cleaner assembly 30. The pivots 40 and 41 are arranged on opposite sides of the central pivot 39, so that the second reciprocatable cleaner device 31 and the second reciprocatable cleaner device 36 move in opposite directions.

In this embodiment, the second reciprocatable cleaner device 36 of the first cleaner assembly 30 is pivotably mounted on a rocker arm 43 via pivot 42. The pivot 42 is arranged on one end of the rocker arm 43. Pivot 44 is present on the opposite end of the rocker arm 43. The pivot 44 pivotably connects the rocker arm 43 to the chassis 1a of the combine harvester.

The cleaning system 4 according to FIG. 3 further comprises a cleaning system drive assembly 50. The cleaning system drive assembly 50 comprises a rotatable drive shaft 51, an eccentric device that comprises a circular element 52. The circular element 52 is connected at a shaft connection point to the rotatable drive shaft 51 to rotate with the rotatable drive shaft. The shaft connection point is located at a distance from the center of the circular element 52. The cleaning system drive assembly 50 comprises a transmission 70.

The transmission 70 comprises an annular member 71. This annular member 71 extends around the circular element 52 and is pivotable around said circular element 52, for example by means of a bearing that extends between the circular element 52 and the annular member 71.

The transmission 70 further comprises a second arm 72. The second arm 72 has a first end 73 and a second end 74. The first end 73 of the second arm 72 is fixedly connected to the annular member 71. The second end 74 of the second arm 72 is in connection with the reciprocatable cleaner device 11 of the second cleaner assembly 10 via pivot 15.

The transmission 70 further comprises a first arm 75. The first arm 75 has a first end 76 and a second end 77. The first end 76 of the first arm 75 is fixedly connected to the annular member 71.

The transmission 70 further comprises a first cleaner drive linkage 80. The first cleaner drive linkage 80 has a first end 81 and a second end 82. The first end 81 of the first cleaner drive linkage 80 is pivotably connected to the second end 77 of the first arm 75 through pivot 78. The second end 82 of the first cleaner drive linkage 80 is connected to the reciprocatable cleaner device 31 of the first cleaner assembly 30, in the embodiment of FIG. 3 via pivot 83.

In the embodiment of FIG. 3, the first cleaner drive linkage 80 comprises a first link 84 and a second link 85. The first link 84 and the second link 85 are pivotably connected to each other through pivot 86. The second link 85 is furthermore pivotably connected to the chassis 1a of the combine harvester through pivot 87. Pivot 86 and pivot 83 are arranged on opposite sides of pivot 87, which makes that the reciprocatable cleaner device 11 of the second cleaner assembly 10 and the reciprocatable cleaner device 31 of the first cleaner assembly 30 are driven in opposite directions.

The reciprocatable cleaner device 11 of the second cleaner assembly 10 and the reciprocatable cleaner device 31 of the first cleaner assembly 30 are reciprocatingly driven by the cleaning system drive assembly 50 in generally parallel directions.

Figure 4:
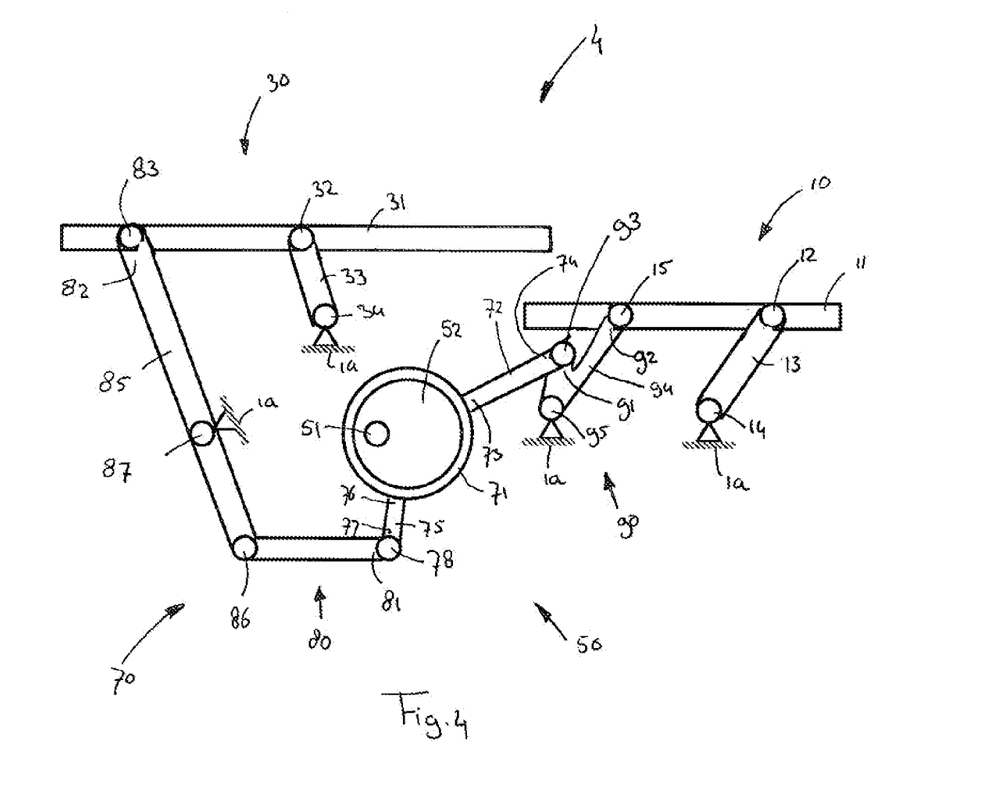
FIG. 4: schematically, a third embodiment of a cleaning system according to the invention.

FIG. 4 schematically shows a third embodiment of a cleaning system 4 according to the invention. The embodiment of FIG. 4 is similar to the embodiments of FIG. 2 and FIG. 3, but in the embodiment of FIG. 4, a second cleaner drive linkage 90 has been provided.

The cleaning system 4 comprises a second cleaner assembly 10 and a first cleaner assembly 30.

The second cleaner assembly 10 comprises a reciprocatable cleaner device 11. The second cleaner assembly 10 is for example a sieve assembly. In that case, the reciprocatable cleaner device 11 is a sieve. In an alternative embodiment, the second cleaner assembly 10 is a grain pan assembly. In that case, the reciprocatable cleaner device 11 is a grain pan.

The first cleaner assembly 30 comprises a reciprocatable cleaner device 31. The first cleaner assembly 30 is for example a grain pan assembly. In that case, the reciprocatable cleaner device 31 is a grain pan. In an alternative embodiment, the first cleaner assembly 30 is a sieve assembly. In that case, the reciprocatable cleaner device 31 is a sieve.

In the embodiment of FIG. 4, the reciprocatable cleaner device 11 of the second cleaner assembly 10 is pivotably mounted on two rocker arms 13 via pivots 12. The pivots 12 are each arranged on one end of the respective rocker arm 13 to which they are connected. Pivots 14 are present on the opposite end of the respective rocker arms 13. The pivots 14 pivotably connect a rocker arm 13 to the chassis 1a of the combine harvester.

In the embodiment of FIG. 4, the reciprocatable cleaner device 31 of the first cleaner assembly 30 is pivotably mounted on one rocker arm 33 via pivot 32. The pivot 32 is arranged on one end of the rocker arm 33. Pivot 34 is present on the opposite end of the rocker arm 33. The pivot 34 pivotably connects the rocker arm 33 to the chassis 1a of the combine harvester.

The cleaning system 4 according to FIG. 4 further comprises a cleaning system drive assembly 50. The cleaning system drive assembly 50 comprises a rotatable drive shaft 51, an eccentric device that comprises a circular element 52. The circular element 52 is connected at a shaft connection point to the rotatable drive shaft 51 to rotate with the rotatable drive shaft. The shaft connection point is located at a distance from the center of the circular element 52. The cleaning system drive assembly 50 comprises a transmission 70.

The transmission 70 comprises an annular member 71. This annular member 71 extends around the circular element 52 and is pivotable around said circular element 52, for example by means of a bearing the extends between circular element 52 and the annular member 71.

The transmission 70 further comprises a second arm 72. The second arm 72 has a first end 73 and a second end 74. The first end 73 of the second arm 72 is fixedly connected to the annular member 71. The second end 74 of the second arm 72 is in connection with the reciprocatable cleaner device 11 of the second cleaner assembly 10 via pivot 15 and second cleaner drive linkage 90.

In the embodiment of FIG. 4, a second cleaner drive linkage 90 has been provided. The second cleaner drive linkage 90 has a first end 91 and a second end 92. The first end 91 of the second cleaner drive linkage 90 is pivotably connected to the second end 74 of the second arm 72 of the transmission 70 by pivot 93. The second end 92 of the second cleaner drive linkage 90 is connected to the reciprocatable cleaner device 11 of the second cleaner assembly 10 by pivot 15.

In the embodiment shown in FIG. 4, the second cleaner drive linkage 90 comprises just a single link 94, but alternative embodiments are possible in which the second cleaner drive linkage 90 comprises multiple links. The single link 94 that is shown in FIG. 4 is pivotably connected to the chassis 1a of the combine harvester through pivot 95.

In a variant of the embodiment of FIG. 4 (not shown in the drawing) the second cleaner drive linkage 90 comprises an adjustable link, which adjustable link allows to adjust the stroke and/or throwing angle of the reciprocatable cleaner device of the second cleaner assembly.

The transmission 70 further comprises a first arm 75. The first arm 75 has a first end 76 and a second end 77. The first end 76 of the first arm 75 is fixedly connected to the annular member 71.

The transmission 70 further comprises a first cleaner drive linkage 80. The first cleaner drive linkage 80 has a first end 81 and a second end 82. The first end 81 of the first cleaner drive linkage 80 is pivotably connected to the second end 77 of the first arm 75 through pivot 78. The second end 82 of the first cleaner drive linkage 80 is connected to the reciprocatable cleaner device 31 of the first cleaner assembly 30, in the embodiment of FIG. 4 via pivot 83.

In the embodiment of FIG. 4, the first cleaner drive linkage 80 comprises a first link 84 and a second link 85. The first link 84 and the second link 85 are pivotably connected to each other through pivot 86. The second link 85 is furthermore pivotably connected to the chassis 1a of the combine harvester through pivot 87. Pivot 86 and pivot 83 are arranged on opposite sides of pivot 87, which makes that the reciprocatable cleaner device 11 of the second cleaner assembly 10 and the reciprocatable cleaner device 31 of the first cleaner assembly 30 are driven in opposite directions.

The reciprocatable cleaner device 11 of the second cleaner assembly 10 and the reciprocatable cleaner device 31 of the first cleaner assembly 30 are reciprocatingly driven by the cleaning system drive assembly 50 in generally parallel directions.

Figure 5:
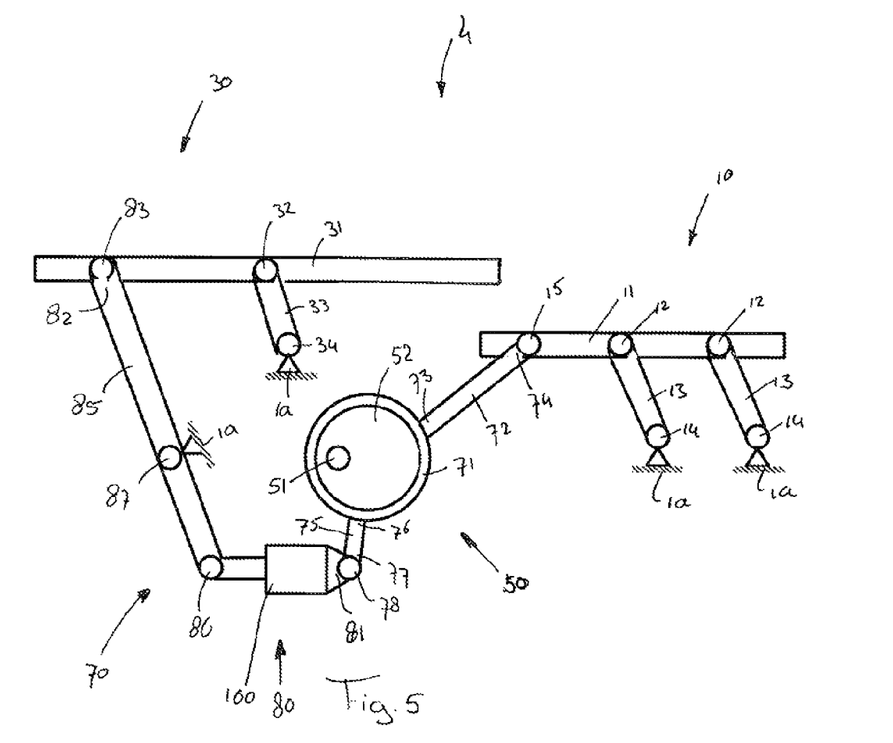
FIG. 5: schematically, a fourth embodiment of a cleaning system according to the invention.

FIG. 5 schematically shows a fourth embodiment of a cleaning system 4 according to the invention. The embodiment of FIG. 5 is similar to the embodiments of FIG. 2, FIG. 3 and FIG. 4, but in the embodiment of FIG. 5, first cleaner drive linkage 80 is provided with an adjustable link 100 which allows to adjust the stroke and/or throwing angle of the reciprocatable cleaner device of the first cleaner assembly 30.

The cleaning system 4 comprises a second cleaner assembly 10 and a first cleaner assembly 30.

The second cleaner assembly 10 comprises a reciprocatable cleaner device 11. The second cleaner assembly 10 is for example a sieve assembly. In that case, the reciprocatable cleaner device 11 is a sieve. In an alternative embodiment, the second cleaner assembly 10 is a grain pan assembly. In that case, the reciprocatable cleaner device 11 is a grain pan.

The first cleaner assembly 30 comprises a reciprocatable cleaner device 31. The first cleaner assembly 30 is for example a grain pan assembly. In that case, the reciprocatable cleaner device 31 is a grain pan. In an alternative embodiment, the first cleaner assembly 30 is a sieve assembly. In that case, the reciprocatable cleaner device 31 is a sieve.

In the embodiment of FIG. 5, the reciprocatable cleaner device 11 of the second cleaner assembly 10 is pivotably mounted on two rocker arms 13 via pivots 12. The pivots 12 are each arranged on one end of the respective rocker arm 13 to which they are connected. Pivots 14 are present on the opposite end of the respective rocker arms 13. The pivots 14 pivotably connect a rocker arm 13 to the chassis 1a of the combine harvester.

In the embodiment of FIG. 5, the reciprocatable cleaner device 31 of the first cleaner assembly 30 is pivotably mounted on one rocker arm 33 via pivot 32. The pivot 32 is arranged on one end of the rocker arm 33. Pivot 34 is present on the opposite end of the rocker arm 33. The pivot 34 pivotably connects the rocker arm 33 to the chassis 1a of the combine harvester.

The cleaning system 4 according to FIG. 5 further comprises a cleaning system drive assembly 50. The cleaning system drive assembly 50 comprises a rotatable drive shaft 51, an eccentric device that comprises a circular element 52. The circular element 52 is connected at a shaft connection point to the rotatable drive shaft 51 to rotate with the rotatable drive shaft. The shaft connection point is located at a distance from the center of the circular element 52. The cleaning system drive assembly 50 comprises a transmission 70.

The transmission 70 comprises an annular member 71. This annular member 71 extends around the circular element 52 and is pivotable around said circular element 52, for example by means of a bearing that extends between the circular element 52 and the annular member 71.

The transmission 70 further comprises a second arm 72. The second arm 72 has a first end 73 and a second end 74. The first end 73 of the second arm 72 is fixedly connected to the annular member 71. The second end 74 of the second arm 72 is in connection with the reciprocatable cleaner device 11 of the second cleaner assembly 10 via pivot 15.

The transmission 70 further comprises a first arm 75. The first arm 75 has a first end 76 and a second end 77. The first end 76 of the first arm 75 is fixedly connected to the annular member 71.

The transmission 70 further comprises a first cleaner drive linkage 80. The first cleaner drive linkage 80 has a first end 81 and a second end 82. The first end 81 of the first cleaner drive linkage 80 is pivotably connected to the second end 77 of the first arm 75 through pivot 78. The second end 82 of the first cleaner drive linkage 80 is connected to the reciprocatable cleaner device 31 of the first cleaner assembly 30, in the embodiment of FIG. 5 via pivot 83.

In the embodiment of FIG. 5, the first cleaner drive linkage 80 comprises a first link 100 and a second link 85. The first link 100 and the second link 85 are pivotably connected to each other through pivot 86.

The first link 100 is an adjustable link, of which the length is adjustable. The first, adjustable link 100 can for example be an actuator. By adjusting the length of the first, adjustable link 100 the stroke and/or throwing angle of the reciprocating cleaner device 31 of the first cleaner assembly 30 can be adjusted.

The second link 85 is furthermore pivotably connected to the chassis 1a of the combine harvester through pivot 87. Pivot 86 and pivot 83 are arranged on opposite sides of pivot 87, which makes that the reciprocatable cleaner device 11 of the second cleaner assembly 10 and the reciprocatable cleaner device 31 of the first cleaner assembly 30 are driven in opposite directions.

The reciprocatable cleaner device 11 of the second cleaner assembly 10 and the reciprocatable cleaner device 31 of the first cleaner assembly 30 are reciprocatingly driven by the cleaning system drive assembly 50 in generally parallel directions.

The invention claimed is:

1. A combine harvester comprising:
a cleaning system comprising:
  a first cleaner assembly comprising at least one reciprocatable cleaner device;
  a second cleaner assembly comprising:
    an upper reciprocatable cleaner device;
    a lower reciprocatable cleaner device; and
    a linkage coupling the upper reciprocatable cleaner device to the lower reciprocatable cleaner device to provide reciprocation of the upper and lower reciprocatable cleaner devices in generally opposite directions;
  a cleaning system drive assembly comprising a rotatable drive shaft; and
  an eccentric device that comprises a circular element that is connected at a shaft connection point to the rotatable drive shaft to rotate with the rotatable drive shaft, wherein the shaft connection point is located at a distance from the center of the circular element; and
a transmission comprising:
  an annular member extending around the circular element and that is pivotable around said circular element;
  a second arm having a first end and a second end, the first end is fixedly connected to the annular member, and the second end is in connection with the reciprocatable cleaner device of the second cleaner assembly;
  a first arm which has a first end and a second end, the first end is fixedly connected to the annular member;
  a first cleaner drive linkage having a first end and a second end, which first end of the first cleaner drive linkage is pivotably connected to the second end of the first arm and the second end of the first cleaner drive linkage is connected to the reciprocatable cleaner device of the first cleaner assembly,
wherein the upper reciprocatable cleaner device of the second cleaner assembly and the at least one reciprocatable cleaner device of the first cleaner assembly are reciprocatingly drivable by the cleaning system drive assembly in generally opposite directions.

2. The combine harvester according to claim 1, wherein the upper reciprocatable cleaner device of the second cleaner assembly and the at least one reciprocatable cleaner device of the first cleaner assembly are reciprocatingly drivable by the cleaning system drive assembly in generally parallel and opposite directions.

3. The combine harvester according to claim 1, wherein the second cleaner assembly is a sieve assembly, and the upper and lower reciprocatable cleaner devices of the second cleaner assembly are sieves.

4. The combine harvester according to claim 1, wherein the first cleaner assembly is a grain pan assembly, and the at least one reciprocatable cleaner device of the first cleaner assembly is a grain pan.

5. The combine harvester according to claim 3, wherein the first cleaner assembly is a sieve assembly, and the at least one reciprocatable cleaner device of the first cleaner assembly is a sieve.

6. The combine harvester according to claim 3, wherein the upper reciprocatable cleaner device is a first sieve and the lower reciprocatable cleaner device is a second sieve, and wherein the linkage has a first end that is connected to the first sieve and a second end that is connected to the second sieve, and wherein the cleaning system drive assembly engages the first sieve.

7. The combine harvester according to claim 6, wherein the first sieve and the second sieve are reciprocately moveable in generally parallel but mutually opposite directions.

8. The combine harvester according to claim 4, wherein the grain pan assembly comprises a first grain pan and a second grain pan, and a grain pan linkage, the grain pan linkage has a first end that is connected to the first grain pan and a second end that is connected to the second grain pan, and wherein the cleaning system drive assembly engages the first grain pan.

9. The combine harvester according to claim 8, wherein the first grain pan and the second grain pan are reciprocately moveable in generally parallel but mutually opposite directions.

10. The combine harvester according to claim 1, wherein the transmission further comprises a second cleaner drive linkage which has a first end and a second end, the first end of the second cleaner drive linkage is pivotably connected to the second end of the second arm and the second end of the second cleaner drive linkage is connected to the upper reciprocatable cleaner device of the second cleaner assembly.

11. The combine harvester according to claim 10, wherein the first cleaner drive linkage comprises an adjustable link, the adjustable link allows to adjust at least one of the stroke and throwing angle of the at least one reciprocatable cleaner device of the first cleaner assembly.

12. The combine harvester according to claim 1, wherein the first cleaner drive linkage comprises an adjustable link, the adjustable link allows to adjust at least one of the stroke and throwing angle of the at least one reciprocatable cleaner device of the first cleaner assembly.

\* \* \* \* \*